(12) United States Patent
Locke et al.

(10) Patent No.: US 8,396,625 B2
(45) Date of Patent: Mar. 12, 2013

(54) ACTIVE IMAGE GENERATION AND SELECTIVE REMOTE ACTUATION OF HEAD RESTRAINT

(75) Inventors: Gerald S. Locke, Lake Orion, MI (US); Arjun V. Yetukuri, Rochester Hills, MI (US); David A. Hein, Sterling Heights, MI (US)

(73) Assignee: Lear Corporation, Southfield, MI (US)

( * ) Notice: Subject to any disclaimer, the term of this patent is extended or adjusted under 35 U.S.C. 154(b) by 670 days.

(21) Appl. No.: 12/631,086

(22) Filed: Dec. 4, 2009

(65) Prior Publication Data

US 2011/0137529 A1      Jun. 9, 2011

(51) Int. Cl.
*G06F 17/00* (2006.01)
*G06F 19/00* (2011.01)
*B60Q 1/00* (2006.01)
*G09F 9/00* (2006.01)
*B60N 2/48* (2006.01)

(52) U.S. Cl. ............ 701/36; 701/49; 340/438; 340/461; 280/734; 297/391; 296/65.01

(58) Field of Classification Search ............ 701/36, 701/45, 48, 49, 51; 340/901, 425.5, 438, 340/457, 457.1, 461, 462, 463, 500, 815.4; 307/9.1, 10.1; 180/268, 271, 281, 282, 269; 280/727, 734, 735; 297/391; 296/65.01, 296/68.1
See application file for complete search history.

(56) References Cited

U.S. PATENT DOCUMENTS

| | | | |
|---|---|---|---|
| 4,977,973 A | 12/1990 | Takizawa | |
| 5,003,240 A | 3/1991 | Ikeda | |
| 5,006,771 A | 4/1991 | Ogasawara | |
| 5,288,129 A | 2/1994 | Nemoto | |
| 6,050,633 A | 4/2000 | Droual | |
| 6,074,011 A | 6/2000 | Ptak et al. | |
| 6,614,579 B2 | 9/2003 | Roberts et al. | |
| 7,367,626 B2 | 5/2008 | Lawall et al. | |
| 7,441,821 B2* | 10/2008 | Yetukuri et al. | 296/63 |
| 7,556,306 B2* | 7/2009 | Yetukuri et al. | 296/63 |

(Continued)

FOREIGN PATENT DOCUMENTS

DE    102006054166 A1    8/2007
WO    WO 2007/035450      3/2007

OTHER PUBLICATIONS

Office Action for Chinese Patent Application No. 201010577845.9 dated Aug. 23, 2012, 15 pages, State Intellectual Property Office of China.

(Continued)

*Primary Examiner* — Thomas Tarcza
*Assistant Examiner* — Edward Pipala
(74) *Attorney, Agent, or Firm* — Brooks Kushman P.C.

(57) ABSTRACT

A head restraint actuation system is provided having a receiver configured for receiving an image signal, a transmission status signal, a head restraint request signal and a seat information signal. A mirror controller is configured for communicating with the receiver for analyzing the received signals and selecting a rearview mirror mode. A user interface is configured for communicating with the mirror controller for displaying the image signal based on the selection of a first mode, and for enabling transmission of a head restraint request to the mirror controller based on the selection of a second mode. A transmitter is configured for communicating with the mirror controller for transmitting the head restraint request to a seat controller based on the selection of the second mode. A head restraint actuator receives the head restraint request and actuates a corresponding head restraint.

20 Claims, 4 Drawing Sheets

U.S. PATENT DOCUMENTS

| | | |
|---|---|---|
| 2005/0270620 A1 | 12/2005 | Bauer et al. |
| 2007/0024711 A1 | 2/2007 | Daura Luna |
| 2007/0064108 A1 | 3/2007 | Haler |
| 2007/0114810 A1 | 5/2007 | Yetukuri et al. |
| 2009/0243634 A1 | 10/2009 | Mattson et al. |
| 2009/0248255 A1 | 10/2009 | Mattson et al. |

OTHER PUBLICATIONS

Rainer Würfl, Office Action for German Patent Application No. 10 2010 042 393.9 dated Aug. 1, 2012, 4 pages, German Patent Office, Munich, Germany.

* cited by examiner

ACTIVE IMAGE GENERATION AND SELECTIVE REMOTE ACTUATION OF HEAD RESTRAINT

BACKGROUND

1. Technical Field

One or more embodiments relate to active image generation of an exterior view from the vehicle and selective remote actuation of a head restraint.

2. Background Art

One example of a system and method for actuation of a head restraint is disclosed in U.S. Pat. No. 7,556,306 to Yetukuri et al. An example of a rearview mirror with integrated video system is disclosed in WO 2007/035450 to Haler.

DETAILED DESCRIPTION OF EMBODIMENTS

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims, and/or as a representative basis for teaching one skilled in the art to variously employ the present invention.

In general a driver looks at their rearview mirror to see an image representing a rear view from a vehicle. However, the mirror does not always present a clear image of the rear view; and often the driver turns around or exits the vehicle to acquire a better view. For example, head restraints extending from rear passenger seats may obscure the driver's rear view. Seating systems have been developed to address this issue by allowing the driver to remotely actuate the rear head restraints via the rear view mirror. Additionally, objects positioned behind the vehicle (e.g., a shopping cart) may not be visible through the rearview mirror. Camera systems have been developed for generating a rearward image in the front of a vehicle, so that the driver can view this rear image while seated. A head restraint actuation system is provided which combines remote head restraint actuation and active rear image generation, accessible to the driver at the rearview mirror assembly. The system communicates with other vehicle systems to automatically enable either feature.

Figure 1:
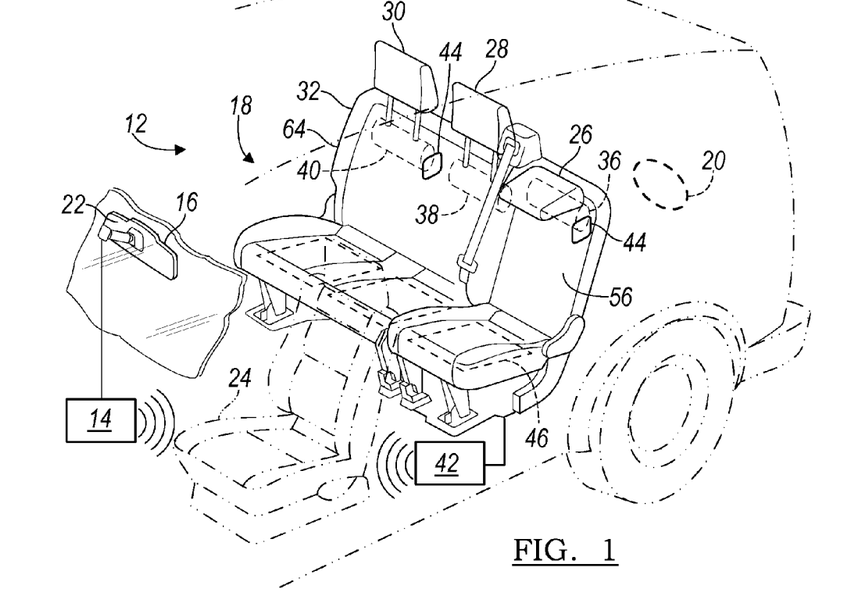
FIG. 1 is a schematic view of a head restraint actuation system according to at least one embodiment of the present invention.

With reference to FIG. 1, a head restraint actuation system is illustrated in accordance with an embodiment and is generally referenced by numeral 10. The system 10 is depicted within a vehicle 12. The system 10 includes a mirror controller 14 and a user interface 16 that communicate with each other. The mirror controller 14 is configured for communicating with a passenger seat system 18 and a rear camera 20. A user is able to access both the seat system 18 and the rear camera 20 via the user interface 16.

The user interface 16 is located in proximity to a driver of the vehicle 12. The user interface 16 may be provided on a front surface of a rearview mirror assembly 22. A driver seat 24 is illustrated in phantom in FIG. 1. A driver sitting in the driver seat 24 is able to access the passenger seat system 18 and the rear camera 20 via the user interface 16. In one embodiment, the mirror controller 14 is mounted within the rear view mirror assembly 22.

The passenger seat system 18 includes a series of head restraints 26, 28, 30 and a seat assembly 32 coupled to one another. The seat assembly 32 includes a second row of seats. Each head restraint 26, 28, 30 is positioned about a top portion of each seat 32, and supports a head of an occupant seated in the corresponding seat. The head restraints 26, 28, 30 may be mounted to the seat assembly 32 or to another adjacent vehicle structure (e.g., rear shelf, roof, etc.). The seat system 18 contemplates multiple rows of seating (e.g., second row and third row) and individual "bucket" seats, or combinations of "bucket" seats and row(s).

The passenger seat system 18 includes a series of actuators 36, 38, 40 for lowering head restraints 26, 28, 30 respectively. The head restraints 26, 28, 30 may be pivotally mounted to the seat assembly 32. As depicted by head restraint 26, each head restraint may pivot forward to provide an unobstructed view for the driver when looking at the rearview mirror assembly 22. The seat system 18 also contemplates actuators configured for both raising and lowering the head restraints 26, 28, 30.

The passenger seat system 18 includes a seat controller 42 for communicating with the mirror controller 14. The seat controller 42 is mounted within the seat assembly 32 and electrically connected to each of the actuators 36, 38, 40. The driver is able to remotely actuate each individual head restraint 26, 28, 30 by interacting with the user interface 16. The user interface 16 transmits the drivers instruction to each actuator 36, 38, 40 through the controllers 14 and 42. U.S. Pat. No. 7,556,306 to Yetukuri et al., discloses a system for actuation of a head restraint and is hereby incorporated by reference.

The seat system 18 includes head restraint position sensors 44 and seat occupancy sensors 46 for gathering information indicative of the status of the seat system 18. The sensors 44 and 46 take measurements and transmit corresponding input signals to the seat controller 42. A head restraint position sensor 44 is mounted proximate to each head restraint actuator 36, 38, 40 for providing a signal indicative of the position of a corresponding head restraint 26, 28, 30. A seat occupancy sensor 46 is disposed with a seat cushion of each seat for providing a signal indicative of whether or not each seat is occupied by a passenger.

In one embodiment of the seat system 18, the position of the head restraint 26, 28, 30 is determined by the amount of electrical power provided to the actuators 36, 38, 40 rather than by using position sensors 44. The actuators 36, 38, 40 may include solenoids for lowering the head restraints 26, 28, 30. The electrical power applied to each solenoid corresponds to the position of the corresponding head restraint 26, 28, 30. For example, an applied voltage of five volts may correspond to a "down" head restraint position, and zero volts may correspond to an "up" head restraint position. The seat controller 42 may monitor this input voltage to determine the position of each head restraint 26, 28, 30.

The rear camera 20 is provided for capturing an image indicative of a rearward image from the vehicle 12. The rear camera 20 is typically mounted on an exterior rear surface of the vehicle 12 (e.g., hatch, rear door, etc.). The camera 20 communicates with the mirror controller 14 for transmitting the image signal to the rearview mirror assembly 22 to be generated upon the user interface 16. Such rearview cameras 20 are known in the art.

Figure 2:
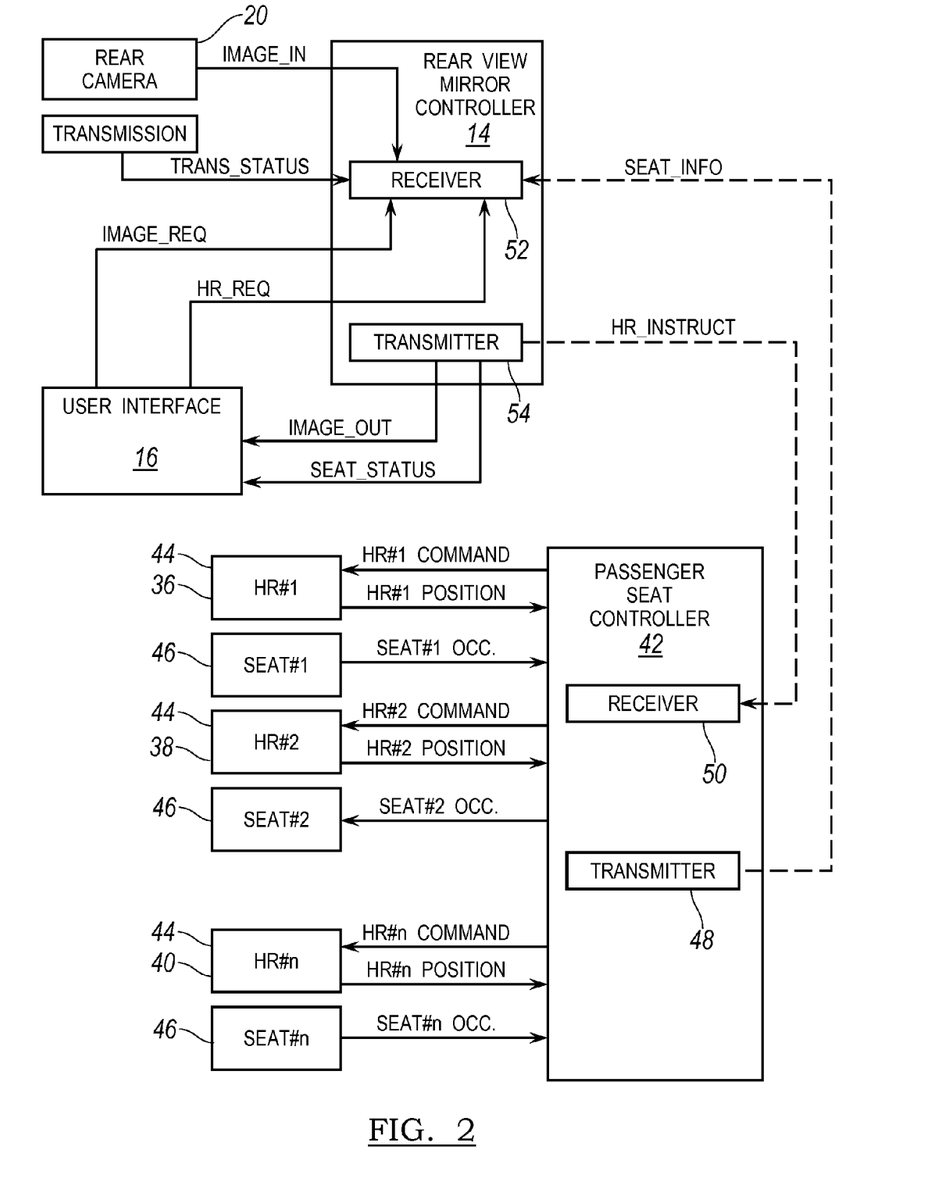
FIG. 2 is a schematic diagram further illustrating the system of FIG. 1.

With reference to FIGS. 1 and 2, the mirror controller 14 and the seat controller 42 communicate with each other using RF communication (as indicated by dashed signal lines). The seat controller 42 includes a seat transmitter 48 and a seat receiver 50 that are configured for communicating with other electronic devices, such as the mirror controller 14. The seat transmitter 48 transmits signals and the seat receiver 50 receives signals. The mirror controller 14 includes a receiver 52 and a transmitter 54 that are configured for communicating with other electronic devices, such as the seat controller 42. Both the mirror controller 14 and the seat controller 42 may use separate receivers/transmitters for different types of communication (e.g., wireless, hardline, data). Although the transmitters and receivers are described as separate components, other embodiments of the system 10 are contemplated with controllers having transceivers (not shown) configured for both receiving and transmitting signals.

Additionally the mirror controller 14 and the seat controller 42 may be configured for exclusive wireless communication with each other. Such exclusive wireless communication is used to prevent miscommunication with outside sources. For example, it would be undesirable for head restraints 26, 28, 30 on the vehicle 12 to actuate in response to head restraint instructions from another nearby vehicle (not shown). U.S. Patent Application Publication No.: 2009/0248255 to Mattson et al., discloses different approaches for linking communication between mirror and seat modules as is hereby incorporated by reference.

The mirror controller 14 and the seat controller 42, generally include any number of microprocessors, ASICs, ICs, memory (e.g., FLASH, ROM, RAM, EPROM and/or EEPROM) and software code to co-act with one another to perform a series of operations.

The mirror controller 14 receives an input image signal (IMAGE_IN) indicative of a rearward image from the camera 20 and transmits a corresponding output image signal (IMAGE_OUT) to the user interface 16. The mirror receiver 52 is configured for receiving the IMAGE_IN signal from the camera 20. The mirror transmitter 54 is configured for transmitting the IMAGE_OUT signal to the user interface 16. The user interface 16 generates an active image in real time upon the rearview mirror assembly 22. The mirror controller 14 may include signal conditioning equipment (not shown) for adjusting the IMAGE_IN signal. In one embodiment of the system 10, the IMAGE_IN signal and the IMAGE_OUT signal are essentially the same, and the mirror controller 14 determines when the IMAGE_OUT signal is transmitted to the user interface 16 by analyzing other input signals received by the controller 14.

The mirror controller 14 receives a transmission status signal (TRANS_STATUS) indicative of a gear selection of a transmission (not shown). The vehicle 12 includes a communication network (e.g., CAN or LIN) for transmitting status data for various vehicle systems (e.g., engine speed, key position, the gear selection of the transmission, etc.). The mirror receiver 52 is configured for receiving such data from the communication network. The mirror controller 14 may include signal conditioning equipment (not shown) for adjusting the TRANS_STATUS signal. The mirror controller 14 analyzes the TRANS_STATUS to determine the current gear selection of the transmission (e.g., reverse, drive or park).

The mirror controller 14 receives a head restraint request signal (HR_REQ) indicative of a desired change in a position of the head restraint from the user interface 16. The mirror receiver 52 is configured for receiving the HR_REQ from the user interface 16 along a hardwire electrical connection. The system 10 includes multiple head restraints 26, 28, 30, and the driver may remotely actuate each head restraint 26, 28, 30 individually from the user interface 16. The system 10 may include multiple HR_REQ signals each transmitted along separate electrical connections. For example the system 10 having three head restraints 26, 28, 30 as depicted in FIG. 1, may include three electrical connections for transmitting the HR_REQ signals to the mirror controller 14.

The seat controller 42 gathers information indicative of the status of the seat system 18 for transmitting corresponding information signals to the mirror controller 14. The seat information signals are generally referenced as "SEAT_INFO" and include information indicative of the head restraint position and seat occupancy for each seat in communication with the seat controller 42. The seat controller 42 may be in electrical communication with up to six seats depending on the configuration of a specific vehicle application. FIG. 2 illustrates such vehicle configurations generally using "HR#n" and "SEAT#n" designations. The seat controller 42 includes signal conditioning equipment (not shown) for modifying any such received signals for analysis. For example, the signal conditioning equipment of the seat controller 42, may include an analog-to-digital converter (not shown), for converting the measured voltage signals into corresponding signals having digital data.

The seat receiver 50 is configured for receiving head restraint position measurement signals (HR#n_POSITION) from the position sensors 44 along hardwire electrical connections. Each head restraint position sensor 44 provides a signal indicative of the position of a corresponding head restraint 26, 28, 30. For example, the first head restraint 26 is illustrated in a lowered or down position in FIG. 1. The corresponding position sensor 44 (HR#1) of FIG. 2 measures that head restraint 26 is lowered and provides a corresponding position signal (HR#1_POSITION) to the seat controller 42. The position sensor 44 may be selected from an assortment of common sensors known in the art for measuring angular position (e.g., potentiometer, encoder, hall effect sensor, etc.). The position sensor 44 may also be a switch for indicating whether the head restraint is up or down.

The seat receiver 50 is configured for receiving seat occupancy measurement signals (SEAT#n_OCC) from the seat occupancy sensors 46. Each seat occupancy sensor 46 provides a signal indicative of whether or not a corresponding seat of the seat assembly 32 is occupied by a passenger. For example, a first seat 56 of the seat assembly 32 is illustrated in a vacant or unoccupied position in FIG. 1. The corresponding occupancy sensor 46 (SEAT#1) of FIG. 2 measures that seat 56 is unoccupied and provides a corresponding unoccupied occupancy signal (HR#1_POSITION). The occupancy sensor 46 may be a common sensor weight or force sensor providing a variable voltage signal indicative of a weight of a passenger. The sensor 46 may also be a switch whose output changes once a certain weight threshold (e.g. twenty pounds) is applied to the seat.

The seat controller 42 converts the received input signals into digital data and transmits a corresponding packet of digital data (SEAT_INFO) to the mirror controller 14 wirelessly. The seat controller 42 is configured for associating each input signal (HR#_POSITION and SEAT#n_OCC), with an identification tag corresponding to the sensor that provided the signal. Additionally, the input signals are generally variable voltage signals in a range of zero to five volts, and the controller 42 may convert this voltage signal into digital data. The seat controller 42 compiles the digital data representing the sensor identification and measurement values into a packet of data. For example the data as described above may be compiled into a thirty two bit (eight hex digit) SEAT_INFO packet or a sixty four bit (sixteen hex digit) packet. The seat controller 42 may send one packet of data (SEAT_INFO) for each seat, or it may form a packet with information on all seats within the seat assembly 32.

The mirror controller 14 converts the received HR_REQ signals into digital data and transmits a corresponding packet of digital data (HR_INSTRUCT) to the seat controller 42 wirelessly. The mirror controller 14 receives the HR_REQ signals from the user interface 16. The mirror controller 14 analyzes the input signals; and under certain conditions, the controller 14 sends the HR_INSTRUCT signal to the seat controller 42. Upon receiving the HR_INSTRUCT signal, the seat controller 42 sends a command signal (HR_COMMAND) to the head restraint actuator 36, 38, 40 for lowering the corresponding head restraint 26, 28, 30.

Figure 3:
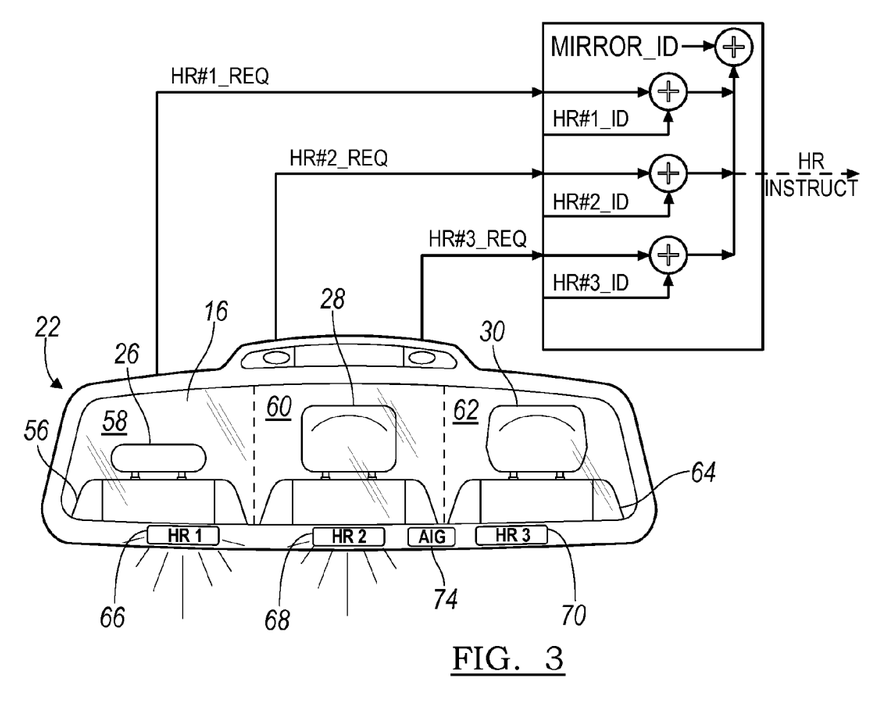
FIG. 3 is an enlarged schematic view of a user interface of the system of FIG. 1.

With reference to FIGS. 2 and 3, the mirror assembly 22 includes a front panel that provides the user interface 16. The user interface 16 includes mirror sensors 58, 60, 62 oriented such that each aligns with a reflected image of a corresponding head restraint 26, 28, 30. The mirror sensors 58, 60, 62 may be selected from capacitive type sensors so that the driver can activate the sensor by bringing their finger in proximity to the sensor, without actually touching it. The user interface 16 is divided into three lateral sections in FIG. 3, illustrating a target area for activating each sensor 58, 60, 62. U.S. Pat. No. 7,556,306 to Yetukuri et al. discloses different types of sensors for rearview mirror assemblies and is incorporated by reference herein.

By activating a mirror sensor 58, 60, 62, the driver requests that the corresponding head restraint 26, 28, 30 changes its position, and a corresponding signal (HR#n_REQ) is sent to the mirror controller 14. Each sensor 58, 60, 62 is hardwired to the mirror controller 14 for transmitting a request signal (HR#n_REQ). The mirror controller 14 is configured for associating each input signal (HR#n_REQ) with an identification tag (HR#n_ID) corresponding to the sensor that provided the signal. Additionally, the input signals are generally variable voltage signals in a range of zero to five volts, and the controller 14 may convert this voltage signal into digital data. The mirror controller 14 compiles the digital data representing the sensor identification and measurement values into a packet of data. For example the data as described above may be compiled into a thirty two bit (eight hex digit) HR_REQ packet or a sixty four bit (sixteen hex digit) data packet.

Figure 4:
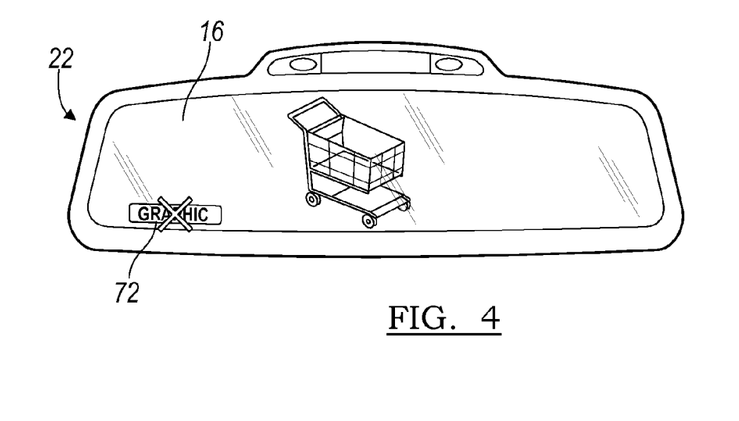
FIG. 4 is another enlarged elevation view of the user interface of the system of FIG. 1, illustrating a rearward image generated on the user interface.

With reference to FIGS. 2-4, the user interface 16 conveys information to the driver regarding the status of the remote head restraint actuation system 10. FIG. 3 illustrates the mirror assembly 22 with a reflected image. FIG. 4 illustrates the mirror assembly 22 with the rearward image generated upon the user interface 16 during an active image generation ("AIG") mode. Under certain conditions the system 10 deactivates remote actuation of one or more of the head restraints 26, 28, 30. For example, if the mirror controller 14 determines that a passenger is sitting in a third seat 64, then the controller 14 may deactivate remote actuation of the corresponding head restraint 30.

A series of illuminated displays 66, 68, 70 may be provided adjacent the user interface 16 for indicating whether or not remote actuation of a corresponding head restraint is enabled. For example, display 66 corresponds to the head restraint 26 of the first seat 56. The mirror controller 14 analyzes the available input signals and determines to enable remote actuation of head restraint 26. Accordingly, the mirror controller 14 may convey this enablement to the driver by illuminating display 66 (as indicated by the lines extending from the display 66 in FIG. 3). The mirror controller 14 may determine not to enable remote actuation of head restraint 30. The mirror controller may convey this non-enablement to the driver by not illuminating display 70. Another embodiment of the system 10, as illustrated in FIG. 4, includes a graphic 72 that is generated upon the user interface 16, along with the rearward image. The graphic 72 may be crossed out, as illustrated in FIG. 4, when remote actuation is not enabled.

The AIG mode may be automatically enabled by the system 10 under certain vehicle 12 conditions (e.g. reversing). In one embodiment of the system 10, an optional AIG mode is available where the driver may manually select AIG mode. The mirror assembly 22 includes an AIG switch 74 for activating AIG. By pressing AIG switch 74 a AIG request signal (IMAGE_REQ) is sent to the mirror controller 14. During the optional AIG mode, the driver may activate AIG regardless of the current gear selection of the transmission.

One embodiment of the system 10 includes multiple seat assemblies 32 and multiple seat controllers 42. Many large vehicles include rear seating that may be selectively removed from the vehicle 12 (not shown). If only one seat controller 42 were used in such an application, and a seat assembly 32 with the lone seat controller 42 was removed, then any remaining head restraint actuators could be inoperable. Therefore one seat controller 42 may be provided for each seat assembly 32.

Another embodiment of the remote head restraint actuation system 10 includes a single seat controller 42 for controlling multiple seat assemblies 32. For such an application the seat controller 42 could be mounted external to the seat assemblies 32 (e.g., in the floor, or trim). The seat controller 42 could be hardwired to each actuator 36, 38 and 40 or could communicate with the actuators wirelessly. Such a seat controller 42 could be configured for communicating with the mirror controller 14 over a hardline vehicle connection using a common bus protocol.

Figure 5:
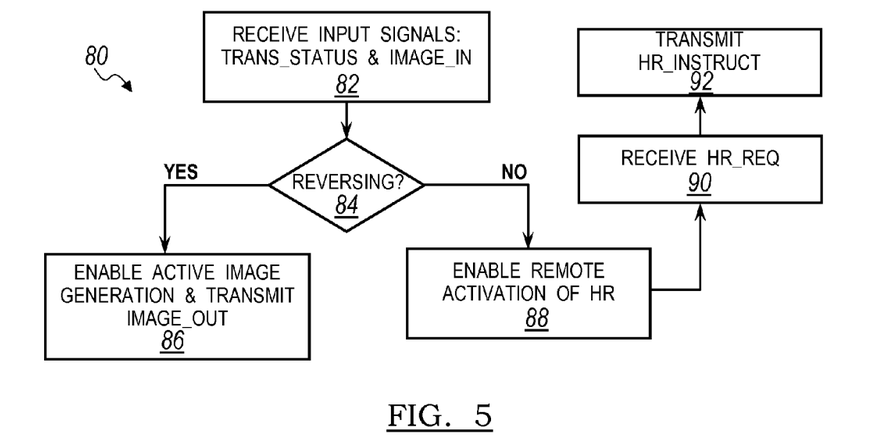
FIG. 5 is a flow chart illustrating a method for enabling a mode of the system of FIG. 1.

FIG. 5 illustrates a method 80 for controlling the head restraint actuation system 10 remotely at the user interface 16. In operation 82, the mirror controller 14 receives input signals: TRANS_STATUS and IMAGE_IN. The TRANS_STATUS signal is indicative of a gear selection of a transmission. The IMAGE_IN signal is indicative of a rearward image from the vehicle. In operation 84, the mirror controller 14 analyzes the TRANS_STATUS signal to determine whether or not the vehicle is reversing.

In operation 86, the mirror controller 14 determines that the vehicle is reversing and the mirror controller 14 enables an active image generation ("AIG") mode by transmitting an IMAGE_OUT signal, corresponding to IMAGE_IN, to the user interface 16. Then the user interface 16 displays the rearward image.

In operation 88, the mirror controller 14 determines that the vehicle 12 is not reversing and the mirror controller 14 enables a remote head restraint actuation mode. In operation 90, while remote head restraint actuation mode is enabled, the mirror controller 14 receives a HR_REQ, indicative of a desired change of a position of a head restraint. In operation 92 the mirror controller 14 transmits a HR_INSTRUCT signal to the seat controller 42, representing the HR_REQ. The seat controller 42 receives the instructions and actuates the head restraint. The method 80 may be utilized for actuating a single head restraint. However, the method 80 also contemplates actuating multiple head restraints 26, 28, 30.

Figure 6:
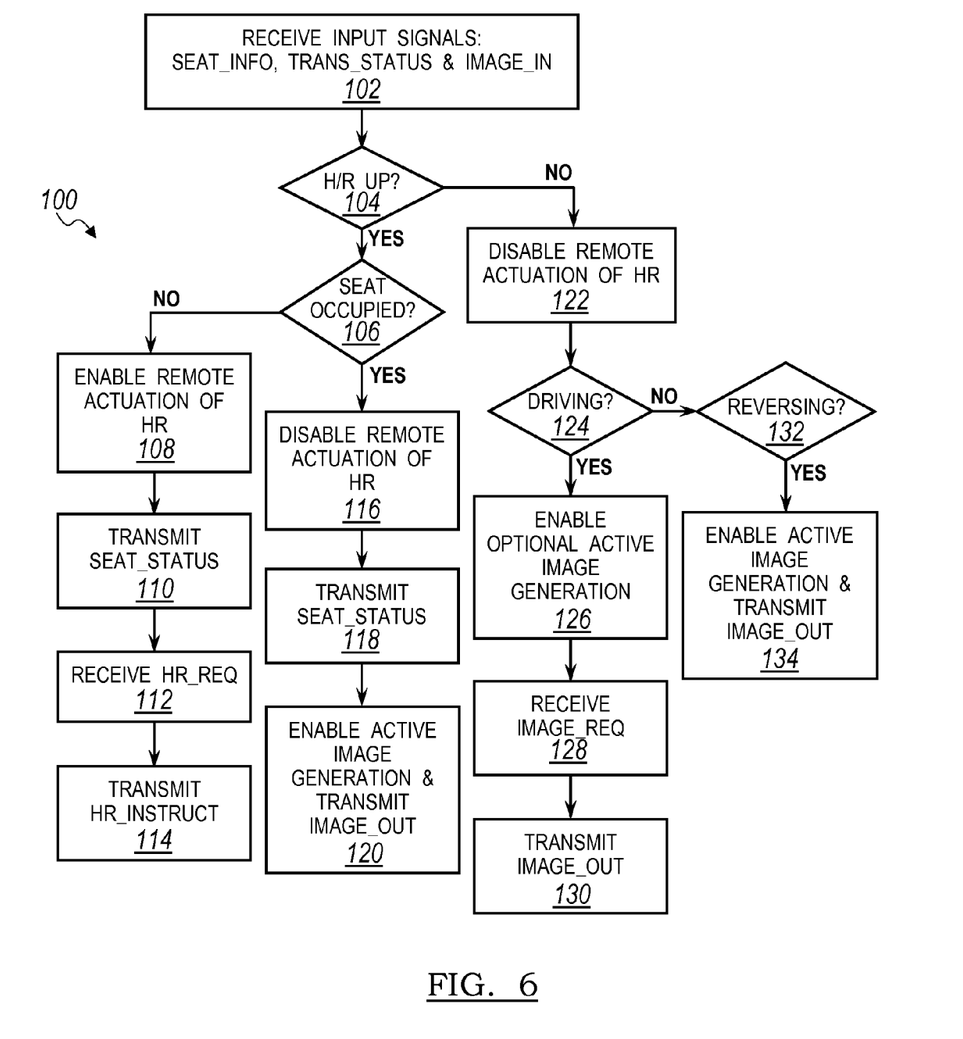
FIG. 6 is a flow chart illustrating another method for enabling a mode of the system of FIG. 1, according to another embodiment.

With respect to FIG. 6, another method 100 is provided for controlling the head restraint actuation system 10 remotely at the user interface 16, for actuating at least one head restraint 26, 28, 30. Method 100 uses the SEAT_INFO signal as feedback of the current status of the seat system 18. In operation 102, the mirror controller 14 receives input signals: SEAT_INFO, TRANS_STATUS and IMAGE_IN. The SEAT_INFO signal includes information of the seat system18 that is indicative of a position of the head restraint and indicative of an occupancy of the corresponding passenger seat. The TRANS_STATUS signal is indicative of a gear selection of the transmission. And the IMAGE_IN signal is indicative of a rearward image from the vehicle.

In operation 104, the mirror controller 14 analyzes the SEAT_INFO signal to determine if the head restraint is in an upward position. In operation 106, after determining that (YES) the head restraint is "up" in operation 104, the mirror controller analyzes the SEAT_INFO to determine if the seat is occupied.

In operation 108, after determining that (NO) the seat is not occupied in operation 106, the mirror controller 14 enables the remote head restraint actuation mode. In operation 110, the mirror controller transmits the SEAT_STATUS signal to the user interface 16 indicating the remote head restraint actuation mode is enabled. Accordingly the user interface 16 illuminates the display or graphic that is indicative of the enablement of the remote head restraint actuation mode. In operation 112, while remote head restraint actuation mode is enabled, the mirror controller 14 receives the HR_REQ, indicative of a desired change of the position of the head restraint. In operation 114 the mirror controller 14 transmits the HR_INSTRUCT signal to the seat controller 42, representing the HR_REQ. The seat controller 42 receives the instructions and actuates the head restraint.

In operation 116, after determining that (YES) the seat is occupied in operation 106, the mirror controller 14 disables the remote head restraint actuation mode. In operation 118, the mirror controller transmits the SEAT_STATUS signal to the user interface 16 indicating that the remote head restraint actuation mode is disabled. Accordingly the user interface 16 does not illuminate the display, or displays a "crossed out" graphic thereby indicating to the user that the remote head restraint actuation mode is not enabled. In operation 120, the mirror controller 14 enables the AIG mode by transmitting an IMAGE_OUT signal, corresponding to IMAGE_IN, to the user interface 16. Then the user interface 16 displays the rearward image.

In operation 122, after determining that (NO) the head restraint is not "up" in operation 104, the mirror controller 14 disables the remote head restraint actuation mode. In operation 124, the mirror controller 14 analyzes the TRANS_STATUS signal to determine whether or not the vehicle is driving in a forward direction. In operation 126, after determining that (YES) the vehicle is driving in a forward direction, the mirror controller 14 enables an Optional AIG mode. In operation 128, while the Optional AIG mode is enabled and after the driver presses the AIG switch 74; the mirror controller receives the IMAGE_REQ signal indicating a desired change to AIG mode. In operation 130, the mirror controller 14 enables the AIG mode by transmitting an IMAGE_OUT signal, corresponding to IMAGE_IN, to the user interface 16. Then the user interface 16 displays the rearward image.

In operation 132, after determining that (NO) the vehicle is not driving forward in operation 124, the mirror controller 14 analyzes the TRANS_STATUS signal to determine whether or not the vehicle is reversing. In operation 134, after determining that the vehicle 12 is reversing in operation 132, the mirror controller 14 enables an active image generation ("AIG") mode by transmitting an IMAGE_OUT signal, corresponding to IMAGE_IN, to the user interface 16. The user interface 16 displays the rearward image.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A head restraint actuation system comprising:
   a mirror controller in communication with a seat having a head restraint actuator, a vehicle network, a camera and a user interface, the mirror controller being configured to:
   receive a transmission status signal indicative of a gear selection of a transmission from the vehicle network,
   receive an image signal indicative of a rearward image from the camera,
   receive a head restraint request signal indicative of a desired change in a position of the head restraint from the user interface;
   enable remote activation of the head restraint at the user interface, based on the transmission status;
   display the rearward image upon a rearview mirror assembly, based on the transmission status; and
   transmit a head restraint instruction signal to the head restraint actuator corresponding to the head restraint request signal, based on the enablement of the remote activation of the head restraint.

2. The head restraint actuation system of claim 1 further comprising:
   a head restraint actuator coupled to a passenger seat for actuating a head restraint; and
   a seat controller in electrical communication with the head restraint actuator.

3. The head restraint actuation system of claim 2 wherein the user interface is provided upon the rearview mirror assembly.

4. The head restraint actuation system of claim 3 wherein the minor controller is further configured to:
   disable remote actuation of the head restraint based on a reverse gear selection of the transmission; and
   display the rearward image upon the rearview mirror, based on the reverse gear selection of the transmission.

5. The head restraint actuation system of claim 3 further comprising a head restraint sensor for providing a head restraint position signal indicative of a position of the head restraint, to the seat controller.

6. The head restraint actuation system of claim 5 further comprising a seat sensor for providing a seat occupancy signal indicative of an occupancy of the passenger seat, to the seat controller.

7. The head restraint actuation system of claim 6 wherein the seat controller is configured to:
   receive the head restraint instruction signal;
   receive the head restraint position signal;
   receive the seat occupancy signal;
   determine a head restraint status based on the head restraint position signal;
   determine a seat status based on the seat occupancy signal; and
   transmit the head restraint status and the seat status to the minor controller.

8. The head restraint actuation system of claim 7 wherein the minor controller is further configured to:
   receive the head restraint status;
   receive the seat status;
   enable remote activation of the head restraint at the rearview minor assembly, based on at least one of the transmission status, the head restraint status and the seat status; and
   display the rearward image upon the rearview mirror assembly, based on at least one of the transmission status, the head restraint status and the seat status.

9. The head restraint actuation system of claim 8 wherein the minor controller is further configured to enable illumination of a seat graphic upon the rearview minor assembly, indicative of the enablement of remote activation of the head restraint, based on at least one of the transmission status, the head restraint status and the seat status.

10. A head restraint actuation system comprising:
    a receiver for receiving an image signal from a camera, a transmission status signal from a vehicle network, and a head restraint request signal from a user interface;
    a minor controller in communication with the receiver for selecting a rearview mirror mode based on the transmission status signal;
    a user interface in communication with the mirror controller for displaying the image signal based on the selection of a first rearview minor mode, and for enabling transmission of a head restraint request to the mirror controller based on the selection of a second rearview minor mode; and
    a transmitter communicating with the mirror controller for transmitting the head restraint request to a passenger seat controller based on the selection of the second rearview minor mode.

11. The head restraint actuation system of claim 10 further comprising a second receiver in communication with the mirror controller, for receiving a seat occupancy signal and a head restraint position signal from the passenger seat controller; wherein the minor controller analyzes at least one of the transmission status, the seat occupancy signal and the head restraint position signal for selecting the rearview mirror mode.

12. The head restraint actuation system of claim 11 wherein the minor controller and the passenger seat controller are configured for wireless communication.

13. A method for controlling a head restraint actuation system, the method comprising:
    receiving a transmission status signal indicative of a gear selection of a transmission;
    receiving an image signal indicative of a rearward image;
    receiving at least one head restraint request signal indicative of a desired change in a position of a corresponding at least one head restraint;
    analyzing the transmission status signal;
    enabling a remote activation of at least one head restraint actuator corresponding to the at least one head restraint, at a rearview minor assembly, based on the transmission status signal;
    displaying the rearward image upon the rearview mirror assembly, based on the transmission status; and
    transmitting a head restraint command signal to the at least one head restraint actuator corresponding to the head restraint request signal, based on the enabling of remote activation.

14. The method for controlling a head restraint actuation system of claim 13 wherein the display of the rearward image is based on a reverse gear selection transmission status.

15. The method for controlling a head restraint actuation system of claim 13 wherein the remote activation of at least one head restraint actuator is enabled based on a non-reverse gear selection transmission status.

16. The method for controlling a head restraint actuation system of claim 13 further comprising:
    receiving at least one head restraint position signal indicative of a position of the at least one head restraint;
    receiving at least one seat occupancy signal indicative of an occupancy of a corresponding at least one passenger seat; and
    enabling the remote activation of the at least one head restraint actuator at the rearview mirror assembly, based on at least one of the transmission status signal, the at least one head restraint position signal and the at least one seat occupancy signal.

17. The method for controlling a head restraint actuation system of claim 16 wherein the display of the rearward image is based on a reverse gear selection transmission status.

18. The method for controlling a head restraint actuation system of claim 16 further comprising:
    disabling remote activation of at least one head restraint actuator based on an at least one downward head restraint position; and
    enabling the display of a rearward image based on a non-reverse gear selection transmission status;
    wherein the display of the rearward image is activated by manually pressing an active image generation switch on a user interface.

19. The method for controlling a head restraint actuation system of claim 16 wherein the remote activation of the at least one head restraint actuator is enabled based on an at least one upward head restraint position, and a corresponding unoccupied seat occupancy signal.

20. The method for controlling a head restraint actuation system of claim 16 wherein the remote activation of at least one head restraint actuator is disabled based on an at least one upward head restraint position, and a corresponding occupied seat occupancy signal.

* * * * *

UNITED STATES PATENT AND TRADEMARK OFFICE
CERTIFICATE OF CORRECTION

| | | |
|---|---|---|
| PATENT NO. | : 8,396,625 B2 | |
| APPLICATION NO. | : 12/631086 | |
| DATED | : March 12, 2013 | |
| INVENTOR(S) | : Gerald S. Locke et al. | |

It is certified that error appears in the above-identified patent and that said Letters Patent is hereby corrected as shown below:

In the Claims:

Column 8, Line 54-55, Claim 4:

After "system of claim 3 wherein the"
Delete "minor" and
Insert -- mirror --.

Column 9, Line 10-11, Claim 7:

After "status to the"
Delete "minor" and
Insert -- mirror --.

Column 9, Line 12-13, Claim 8:

After "system of claim 7 wherein the"
Delete "minor" and
Insert -- mirror --.

Column 9, Line 16-17, Claim 8:

After "at the rearview"
Delete "minor" and
Insert -- mirror --.

Signed and Sealed this
Sixteenth Day of July, 2013

Teresa Stanek Rea
*Acting Director of the United States Patent and Trademark Office*

CERTIFICATE OF CORRECTION (continued)
U.S. Pat. No. 8,396,625 B2

Column 9, Line 23-24, Claim 9:

After "system of claim 8 wherein the"
Delete "minor" and
Insert -- mirror --.

Column 9, Line 25, Claim 9:

After "upon the rearview"
Delete "minor" and
Insert -- mirror --.

Column 9, Line 33, Claim 10:

Delete "a minor controller" and
Insert -- a mirror controller --.

Column 9, Line 38, Claim 10:

After "a first rearview"
Delete "minor mode" and
Insert -- mirror mode --.

Column 9, Line 40-41, Claim 10:

After "a second rearview"
Delete "minor mode" and
Insert -- mirror mode --.

Column 9, Line 44-45, Claim 10:

After "of the second rearview"
Delete "minor mode" and
Insert -- mirror mode --.

Column 9, Line 49-50, Claim 11:

After "seat controller; wherein the"
Delete "minor controller" and
Insert -- mirror controller --.

CERTIFICATE OF CORRECTION (continued)
U.S. Pat. No. 8,396,625 B2

Column 9, Line 54-55, Claim 12:

After "system of claim 11 wherein the"
Delete "minor" and
Insert -- mirror --.

Column 10, Line 12, Claim 13:

After "at a rearview"
Delete "minor assembly" and
Insert -- mirror assembly --.